United States Patent [19]

Itoh

[11] Patent Number: 5,276,302
[45] Date of Patent: Jan. 4, 1994

[54] EDM APPARATUS CURRENT EFFICIENCY CONTROL TECHNIQUE

[75] Inventor: Tetsuro Itoh, Rolling Meadows, Ill.
[73] Assignee: Mitsubishi Denki K.K., Tokyo, Japan
[21] Appl. No.: 884,130
[22] Filed: May 18, 1992
[51] Int. Cl.$^5$ .............................................. B23H 1/02
[52] U.S. Cl. .............................. 219/69.17; 219/69.13; 219/69.16; 219/69.18
[58] Field of Search ............... 219/69.13, 69.14, 69.17, 219/69.18, 69.16

[56] References Cited

U.S. PATENT DOCUMENTS

| | | | |
|---|---|---|---|
| 3,987,269 | 10/1976 | Inoue et al. | 219/69.17 |
| 4,090,961 | 5/1978 | Rhyner et al. | 219/69.13 |
| 4,185,184 | 1/1980 | Pfau | 219/69.16 |
| 4,288,675 | 9/1981 | Inoue | 219/69.17 |
| 4,370,536 | 1/1983 | Kruth | 219/69.17 |
| 4,822,970 | 4/1989 | Levy et al. | 219/69.16 |
| 5,117,083 | 5/1992 | Kawamura | 219/69.16 |

FOREIGN PATENT DOCUMENTS

| | | | |
|---|---|---|---|
| 144221 | 10/1980 | German Democratic Rep. | 219/69.18 |
| 58-206312 | 12/1983 | Japan | 219/69.18 |
| 63-318211 | 12/1988 | Japan . | |

*Primary Examiner*—Geoffrey S. Evans
*Attorney, Agent, or Firm*—Sughrue, Mion, Zinn, Macpeak & Seas

[57] ABSTRACT

A method for controlling an electric discharge machining apparatus of the type in which a workpiece is machined by generating an electric discharge across a machining gap between a confronting electrode and the workpiece through a machining solution while feeding the electrode towards the workpiece includes the steps of determining current removal rate of material from the workpiece, calculating current removal efficiency based on the current removal rate and average machining current applied to the electrode, comparing the current removal efficiency with an optimal removal efficiency corresponding to peak current applied to the electrode, and when the current removal efficiency is less than or equal to a predetermined percentage of the optimal removal efficiency, adjusting at least one of a plurality of machining parameters to increase the current removal efficiency. According to one aspect of the present invention, the machining parameters include average machining current, the ON time of an applied voltage pulse, the circulation rate induced by a jump operation of the electrode and the flow rate of machining solution in the machining gap. The optimal removal efficiency values used in the inventive method are determined experimentally.

22 Claims, 4 Drawing Sheets

EDM APPARATUS CURRENT EFFICIENCY CONTROL TECHNIQUE

FIELD OF THE INVENTION

The present invention relates generally to an electric discharge machining (EDM) apparatus. More specifically, the present invention relates to a technique for efficiently controlling the current of an EDM apparatus having an electrode opposing a workpiece across a machining solution. The present inventive method is particularly advantageous in that it allows the EDM apparatus to operate at removal efficiencies close to optimal removal efficiencies determined by experimentation.

BACKGROUND OF THE INVENTION

A typical EDM apparatus 1 of the type described above is illustrated in FIG. 1 and includes an electrode 10 supported by a shaft 12 and suspended over a tank 14. Shaft 12 is connected at its opposite end to a cylinder 16, which is positioned by hydraulic fluid provided by a motor 20 via an electrically controlled servo valve 18. Electrode 10 opposes a workpiece 22 across a machining gap G. Tank 14 is filled with a machining solution 24, whose level in the tank insures that machining gap G is always filled with machining solution 24.

Figure 1:
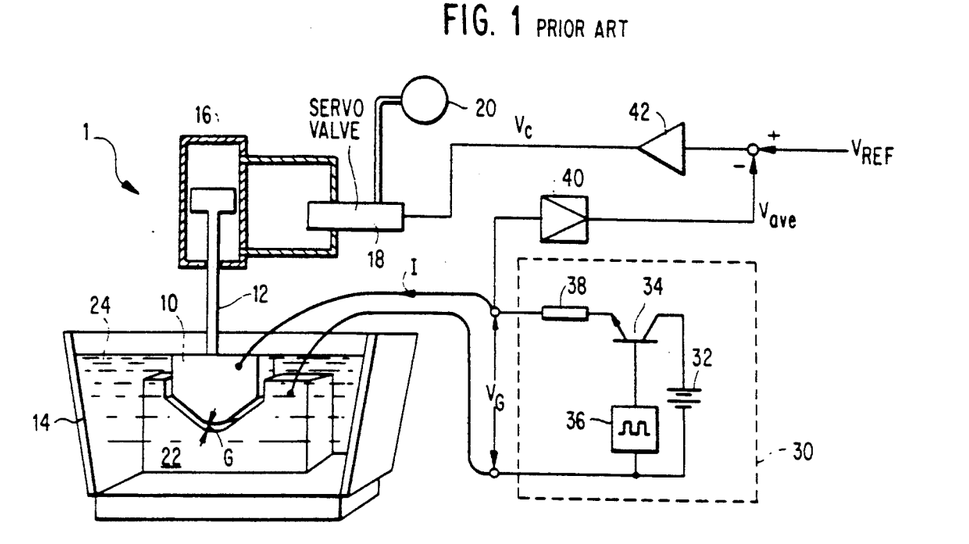
FIG. 1 is an illustrative diagram of a typical EDM apparatus for explaining the background in which the present invention was made.

Electrode 10 and workpiece 22 are serially connected by a pair of leads to output terminals of machining power source 30, which includes a DC power supply 32 with a rated output of E volts (V), a switch 34 for switching the power source 30 ON and OFF, an oscillator 36 for controlling the operation of switch 34 and a current limiting resistor 38 with a resistance value of R. Power source 30 supplies an interelectrode voltage $V_G$ to the pair of leads so that a switching current I is applied between electrode 10 and workpiece 22.

The switching current I is represented by the expression $I = (E - V_G)/R$, where $V_G$ is in the range of about 20 to 30 V during an arc discharge period, 0 V during a short circuiting period and E V during periods when no arc discharge occurs. If the interelectrode voltage $V_G$ is detected and averaged by a smoothing circuit 40, the machining gap G can be controlled in response to the averaged value of the interelectrode voltage $V_G$. More specifically, when the machining gap G is wide, a discharge across the machining gap does not occur and the average voltage, hereinafter denoted $V_{ave}$, becomes high, i.e., approaches E. When the gap is narrow, a short circuit between the electrode 10 and workpiece 22 can occur, which results in a reduction in the average voltage $V_{ave}$. Accordingly, when the value of $V_{ave}$ is compared with a reference voltage $V_{REF}$, the magnitude and polarity of the difference between these two voltages can be applied to servo 18 via an amplifier 42 to position electrode 10 with respect to workpiece 22. Thus, the difference between $V_{ave}$ and $V_{REF}$, e.g., control voltage $V_C$, can be used to control the machining gap G at a substantially constant value.

However, those of ordinary skill in the art will appreciate that controlling the machining gap alone does not amount to controlling the operating parameters of the EDM apparatus 1 to optimize the material removal rate during a machining operation. The change in a wide variety of physical conditions in EDM apparatus 1 can effect the interelectrode voltage $V_G$. Sludge accumulation in machining gap G, for example, can result from a low circulation or flow rate of machining solution in machining gap G and can decrease the interelectrode impedance, thus causing a decrease in $V_G$. Also, carbonization of electrode 10 due to thermal decomposition of the machining solution 24 or other causes can increase the possibility of arcing or abnormal machining, and lower the value of $V_G$. Therefore, even when an optimal material removal rate for an electrode/workpiece combination has been determined by experimentation, EDM apparatus 1 cannot be controlled to achieve that optimal removal rate.

SUMMARY OF THE INVENTION

The present invention was motivated by a desire to develop a method for operating an EDN apparatus whereby the apparatus could be controlled to provide a material removal efficiency approximating the optimal material removal efficiency determined for a particular electrode/material combination.

The principal purpose of the present invention is to provide a technique for controlling the operation of an EDM apparatus whereby one or more of a plurality of control parameters are adjusted based on a comparison of the current removal efficiency and an optimal removal efficiency. According to one aspect of the present inventive method, the optimal removal efficiency is determined for each electrode/workpiece combination by experimentation.

Another object of the present invention is to provide a technique for controlling a machining operation performed by an EDM apparatus by adjusting at least one of a plurality of operating parameters based on a plurality of easily determined performance characteristics. According to the technique of the present invention, the adjustments made to the operating parameters of the EDM apparatus can be determined based on a time averaged material removal rate and the average current applied to the electrode of the apparatus. The material removal rate can be determined from the surface area opposing the workpiece and the rate of change in electrode position along one axis of the apparatus during an elapsed time period.

Still another object of the control technique according to the present invention is to provide a control method which can be implemented at low cost.

These and other objects, features and advantages of the present invention are provided by a method for controlling an electric discharge machining apparatus of the type in which a workpiece is machined by generating an electric discharge across a machining gap between a confronting electrode and the workpiece through a machining solution while feeding the electrode towards the workpiece. The method comprises the steps of determining current removal rate of material from the workpiece, calculating current removal efficiency based on the current removal rate and average current applied to the electrode, comparing the current removal efficiency with an optimal removal efficiency corresponding to peak current applied to the electrode, and when the current removal efficiency is less than or equal to a predetermined percentage of the optimal removal efficiency, adjusting at least one of a plurality of machining parameters including the machining ON time and the average machining current to increase the current removal efficiency.

According to one aspect of the present invention method, current removal efficiency is determined by dividing the current removal rate by the average machining current, which advantageously demonstrates that the current removal efficiency can be controlled by adjusting parameters of a machining operation which result in a decrease in the average machining current. It will be noted that average machining current can be adjusted directly. In addition, the ON time of voltage applied across a gap between the electrode and the workpiece can be adjusted so as to decrease the ON time of the voltage and thereby reduce the average machining current.

According to the present invention, the current removal efficiency advantageously can be adjusted by controlling the circulation rate or flow rate of machining solution in the machining gap. According to another aspect of the present invention, a jump value corresponding to the circulation rate of machining solution induced by a jump operation performed by the electrode can be adjusted so as to increase the jump value and, consequently, increase the circulation rate. Current removal efficiency advantageously can be adjusted in response to control of the flow rate of, for example, a pump circulating machining solution in the machining gap.

According to yet another aspect of the present invention, the steps described immediately above advantageously can be repeated at regular intervals so that the current removal efficiency can be adjusted repetitively during the machining operation.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted throughout by like or similar numbers, and in which.

DESCRIPTION OF THE PREFERRED EMBODIMENTS

Figure 2:
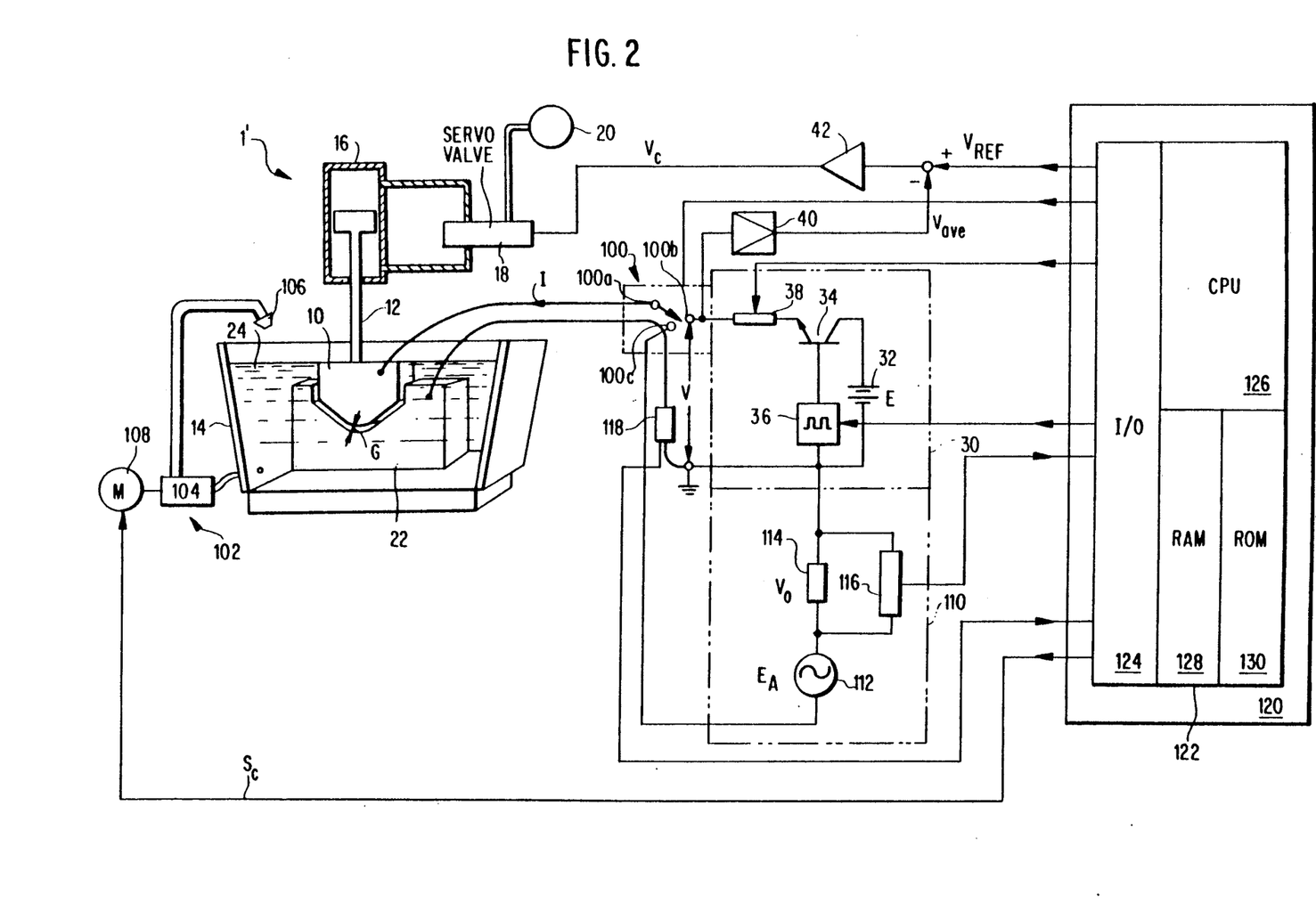
FIG. 2 is an illustrative diagram of an EDM apparatus suitable for performing the control technique according to the present invention.

Prior to describing the control technique according the present invention, a brief description of an EDM apparatus 1', which is adapted to perform that control technique, will be presented. EDN apparatus 1' is similar in structure to EDM apparatus 1 illustrated in FIG. 1, and a description of common features will not be provided in the interest of brevity.

Referring to FIG. 2, EDM apparatus 1' includes a switch 100 serially coupled between power source 30 and electrode 10. Switch 100 advantageously includes a movable contact 100a and fixed contacts 100b and 100c, which are respectively connected to power source 30 and capacitance sensor 110, as shown in FIG. 2. Preferably, sensor 110 includes a high frequency power supply 112 producing an alternating voltage $E_A$, a resistor 114 producing a voltage drop $V_0$ and a sensing circuit 116 for measuring the voltage drop of one leg of a voltage divider network formed by the series connected components including resistor 114, electrode 10, machining gap G and workpiece 22 and calculating a capacitance value C based on the measured voltage drop. An ammeter 118 advantageously can be located in EDM apparatus 1' between switch 100 and ground for providing an output signal corresponding to instantaneous current across machining gap G. It should be noted that other mechanisms for determining current, e.g., determining current based on the voltage drop across resistor 38, advantageously can be used in place of a dedicated ammeter 118.

EDM apparatus 1' includes a circulating device 102 for circulating machining solution in machining gap G at a desired flow rate F. Preferably, circulating device 102 includes a variable displacement pump 104 connected to a nozzle 106 and tank 14 by outlet and inlet pipes, respectively. Pump 104 advantageously can be, in an exemplary case, a positive displacement pump driven by a variable speed motor 108 in response to a speed control signal $S_C$.

It will be apparent that other forms of circulating devices can be employed to control the flow rate F of machining solution 24 in machining gap G. Circulation of machining solution 24 advantageously can be induced in machining gap G by moving electrode 10 to perform a "jump" operation. In other words, pumping action is induced by moving electrode 10 from a low point position to a second, higher position repetitively, i.e., a jump operation. In an exemplary case, the jump operation can be controlled by controlling the value of $V_{REF}$, thus varying the signal provided to servo valve 18. More sophisticated means for controlling jump operations and setting jump values for controlling that operation are disclosed, for example, in commonly assigned co-pending U.S. patent application Ser. No. 07/792,604, which is incorporated herein by reference.

Preferably, EDM apparatus 1' includes a numerical controller 120 for controlling the various components in order to perform a machining operation on workpiece 22. Those of ordinary skill in the art will appreciate that the machining operation can include control of electrode 10 position with respect to x and y-axes defining a plane parallel to the upper surface of workpiece 22 as well as the depth of machining performed by electrode 10 with respect to a z-axis. Numerical controller 120 advantageously includes a controller 122 for sensing and adjusting operating parameters of EDM apparatus 1'. Preferably, controller 122 includes an input/output (I/O) circuit 124 coupled to a central processor unit (CPU) 126, which, in turn, is connected to a temporary storage memory, e.g., random access memory (RAM), 128 and a permanent storage memory, e.g., read only memory (ROM), 130. It should be noted that the described configurations of numerical controller 120 and controller 122 are for illustration only and that other configurations advantageously can be used to perform the control technique of the present invention, which is discussed in greater detail below. Preferably, I/O circuit 124 is coupled to receive signals from sensor 110 and ammeter 118 and to provide signals to switch 100, circulating device 102 and power source 30. Most preferably, I/O circuit 124 is coupled to oscillator 36 in power source 30 for controlling switch 34 according to a control signal provided to oscillator 36, as discussed in greater detail below. Resistor 38 advantageously can be a variable resistor and, in an exemplary case, a control signal applied to resistor 38 can be employed to vary the current I applied to electrode 10, which feature is also discussed in greater detail below. In addition, I/O circuit 124 advantageously can be connected to an electrode 10 position sensing device (not shown) such as that disclosed in U.S. Pat. No. 4,510,364, which is incorporated herein by reference for all purposes.

Figure 3:
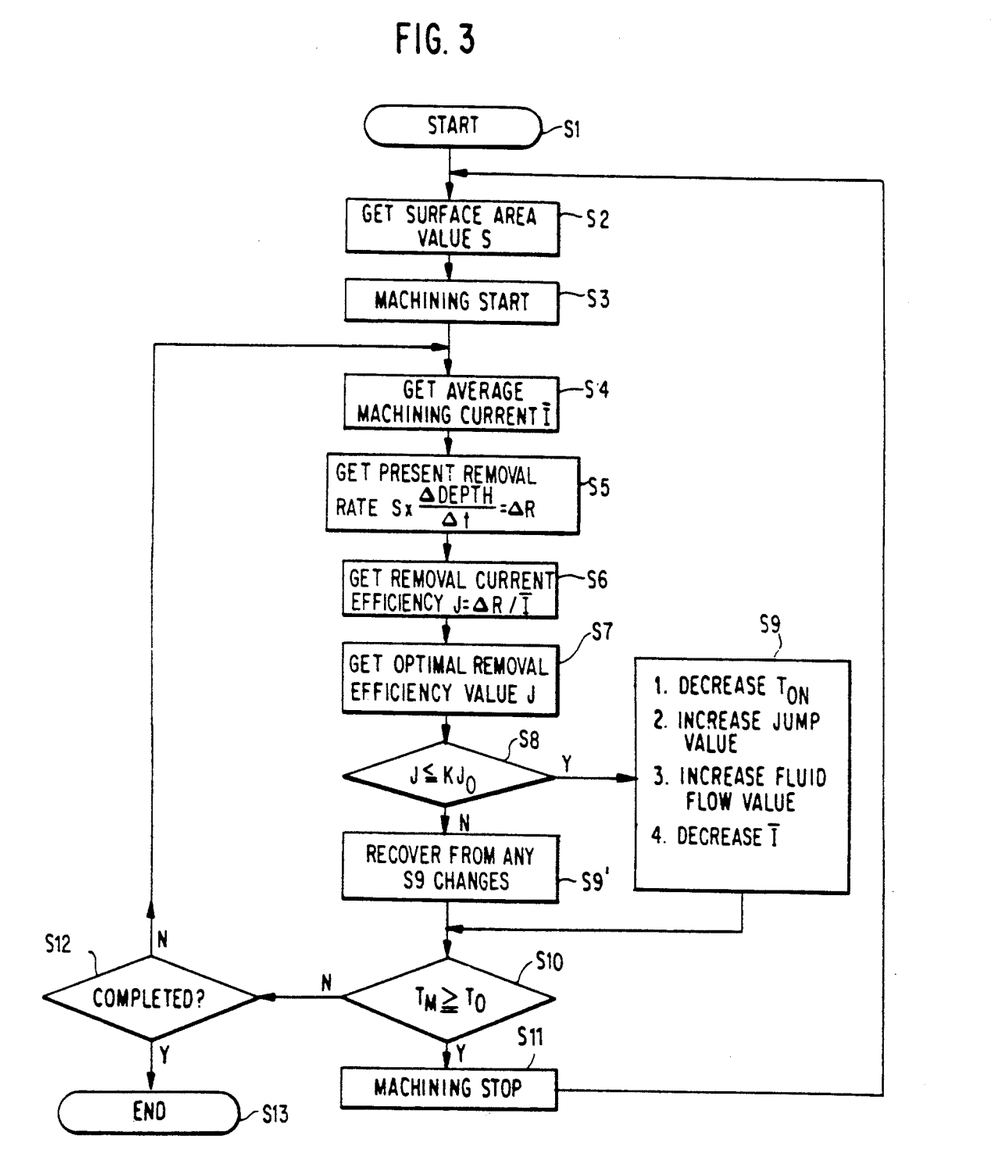
FIG. 3 is a flowchart illustrating the steps of the inventive control technique according to the present invention.

The EDM apparatus control technique according to a preferred embodiment of the present invention will now be described while referring to FIG. 3, which shows a flowchart of the individual operating steps of this preferred embodiment of the present invention.

At step S1, numerical controller 120 is prepared for operation. Those of ordinary skill in the art will appreciate that this step generally refers to prefatory activities including reading machining operation parameters from a numerical control program, initializing variables and warming up circuits in EDM apparatus 1', which activities are performed prior to receipt of a start signal produced by, for example, an operator pressing a key on the control panel (not shown) of numerical controller 120. Upon receipt of the start signal, step S2 is performed.

During step S2, a value S corresponding to the surface area of electrode 10 opposing the workpiece 22 is determined. It will be apparent that for electrodes having a regular geometric shape, such as a rectangular electrode or a right circular cylinder electrode, the surface area determination can be made by calculating the surface area based on the depth d, measured with respect to the z-axis, of electrode 10 in workpiece 22. However, when electrode 10 is an irregular shape, such as that illustrated in FIG. 4, it can be difficult to calculate surface area S. Sensor 110 advantageously provides circuitry for performing a surface area determination.

Figures 4, 5, 6:
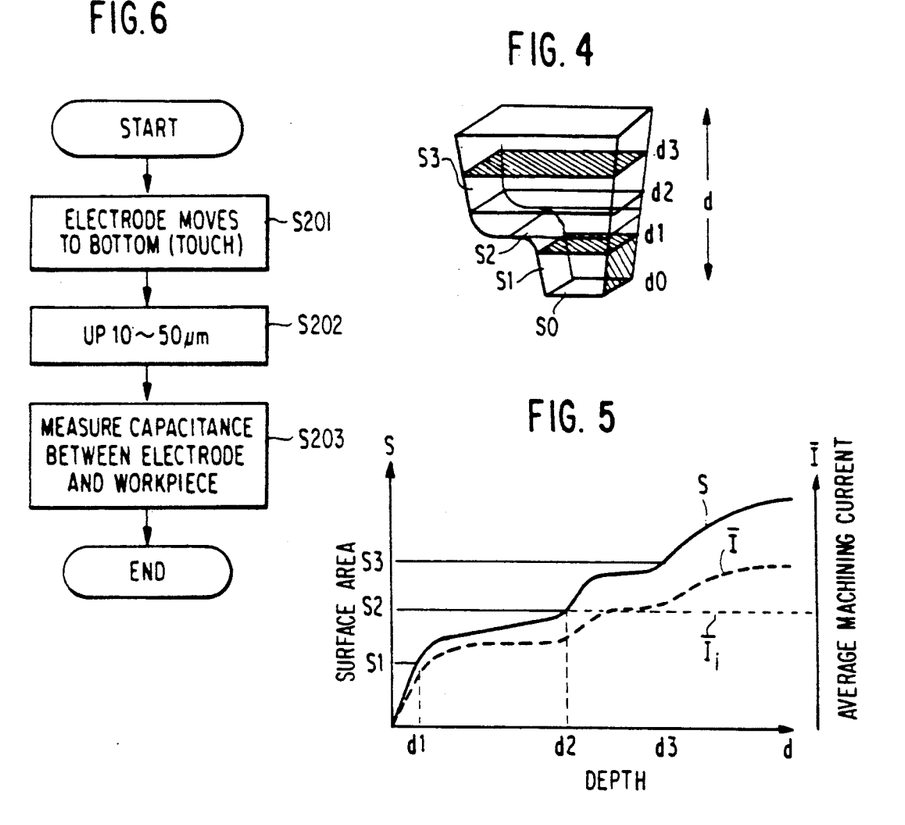
FIG. 4 is an illustrative diagram of an electrode employed in the apparatus of FIG. 2 for explaining surface area determination according to one of the steps set forth in FIG. 3.
FIG. 5 illustrates a series of curves useful in understanding the relationship between surface area and average machining current applied to the electrode illustrated in FIG. 4.
FIG. 6 is a flowchart illustrating a subroutine of the flowchart shown in FIG. 3 for determining capacitance.

As shown in FIG. 4, the surface area S of electrode 10 varies irregularly with respect to a depth d measured from the lowermost point of electrode 10. As depth d increases from $d_0$ to $d_1$, for example, surface area S increases from $S_0$ to $S_1$. Thus, as shown in FIG. 4, surface area $S_0$ is equal to the lowermost face of electrode 10 while surface area $S_1$ is the surface area of electrode 10 from the lower most point of the electrode to a plane bisecting electrode 10 at depth $d_1$.

Examination of FIG. 5, wherein one of the curves represents surface area S plotted as a function of depth d for the electrode of FIG. 4, will make it apparent that, in order to determine surface area S accurately, actual measurement of a parameter corresponding to surface area should be performed. It will be noted that the opposing surfaces of electrode 10 and workpiece 22 form a capacitive structure with machining solution 24 acting as a dielectric material. The capacitance of this structure is given by the equation:

$$C = \epsilon_0 \times \epsilon_g \times (S/g) \quad (1)$$

where C is the capacitance in $\mu F$, $\epsilon_0$ is the dielectric constant of a vacuum, i.e., $8.842 \times 10^{-8}$ $\mu f/cm$, $\epsilon_g$ is the dielectric constant of machining solution 24 in $\mu F/cm$, S is the surface area of electrode 10 in $cm^2$ and g is the gap distance separating electrode 10 from workpiece 22 in cm.

Surface area determination will now be described while referring to FIGS. 2 and 6. As shown in FIG. 2, movable contact 100a of switch 100 is positioned to strike fixed contact 100b during normal machining operations. When it is desired to measure surface area S of electrode 10, a control signal generated by CPU 126 and output by I/O circuit 124 causes contact 100a to align with fixed contact 100c, thus disconnecting power source 30 from electrode 10 and workpiece 22 and connecting sensing circuit 110 to those components.

Referring to FIG. 6, a subroutine for determining capacitance includes step S201 whereby the electrode 10 is moved to its lower most point of travel. In other words, electrode 10 is lowered until it contacts workpiece 22. Then, during step S202, electrode 10 is retracted for a predetermined distance, e.g., electrode 10 is moved upward a distance of about 10–50 micrometers ($\mu m$). During step S203, high frequency power 112 is energized to apply alternating voltage $E_A$ to resistor 114 and the capacitive structure discussed above. It will be noted that resistor 114 and the capacitive structure advantageously form a voltage divider network. Since $E_A$ is a predetermined value, and since the voltage drop $V_0$ across resistor 114 advantageously can be determined by sensing circuit 116, controller 122 can calculate the capacitance of the capacitive structure in a known manner. Thus, using equation (1), discussed above, the surface area S of electrode 10 opposing workpiece 22 advantageously can be determined by controller 122.

Figure 7:
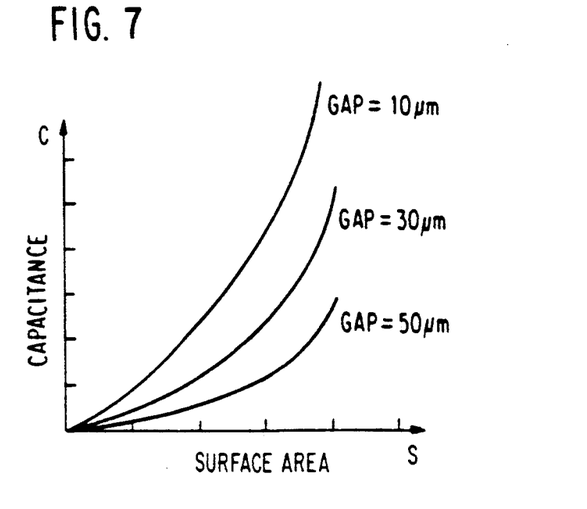
FIG. 7 illustrates a series of curves relating surface area to capacitance.

Referring to FIG. 7, a family of curves relating surface area S to capacitance C are illustrated, with each curve depicting a predetermined gap distance g. It will be appreciated that the data producing this family of curves can advantageously be stored in memory 130 as a lookup table, thus allowing a value corresponding to surface area S to be retrieved from memory 130 without calculation when both capacitance C and gap distance g are known.

It will be apparent that a value corresponding to average machining current $\bar{I}$ cannot be determined during initial performance of step S2 although, as discussed in greater detail below, average machining current $\bar{I}$ advantageously is determined in later steps for subsequent use. Referring again to FIG. 5, a curve showing an initial value $\bar{I}_i$ for average machining current based on surface area S can be determined by experimentation and stored in memory 130. Preferably, this initial average machining current $\bar{I}_i$ is stored in memory 128 for later recall.

Referring again to FIG. 3, after surface area S is determined and an initial value for average machining current $\bar{I}_i$ is stored in memory 128 of controller 122 during step S2, the machining operation is started in step S3 using those values. After a predetermined period of time, e.g., about 10 minutes, control of EDM apparatus 1' then passes to step S4.

During Step S4, the actual average machining current $\bar{I}$ is determined. It will be appreciated that ammeter 118 advantageously permits direct measurement of this parameter throughout the predetermined time period and that average machining current $\bar{I}$ can thus be determined from current data accumulated in memory 128 of controller 122.

Next, during step S5, a value corresponding to current material removal rate $\Delta R$ is calculated based on average machining current $\bar{I}$ and the change in depth d of electrode 10 during the elapsed time period $\Delta t$ from the start of the current machining operation begun in step S3. More specifically, current material removal rate is given by the equation:

$$\Delta R = S \times \Delta d / \Delta t \qquad (2)$$

In other words, current material removal rate $\Delta R$ is determined from surface area S multiplied by the rate of change of depth d, measured in the z-axis direction, with respect to elapsed time $\Delta t$.

A value corresponding to current removal efficiency J is then determined during step S6 based on average machining current $\bar{I}$ and $\Delta R$. In particular, current removal efficiency is computed using the equation:

$$J = \Delta R / \bar{I} \qquad (3)$$

where $\Delta R$ is the current removal rate calculated using equation (2) and $\bar{I}$ is the average machining current determined from accumulated current data.

Figure 8:
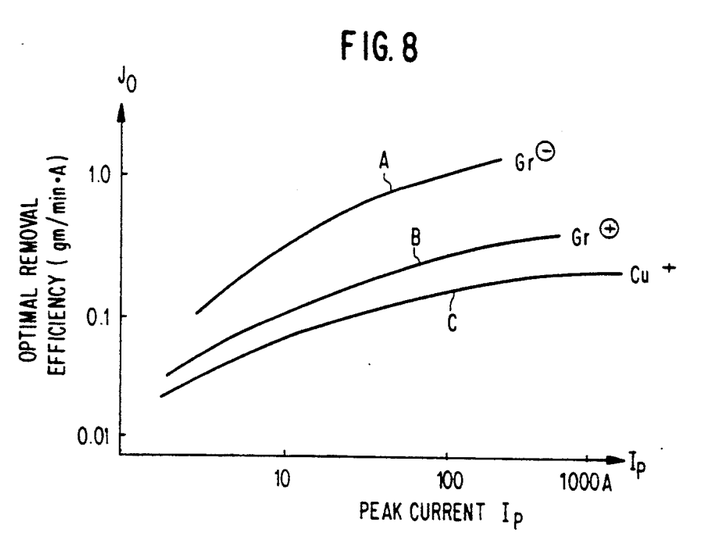
FIG. 8 is a series of curves illustrating the relationship between removal efficiency and peak current according to the control technique of FIG. 3 for several typical electrodes employed in the EDM apparatus of FIG. 2.

During step S7, optimal removal efficiency $J_0$ is determined based on peak current $I_p$ applied to electrode 10. Preferably, optimal removal efficiency $J_0$ is determined by experimentation for each electrode 10 material and each workpiece 22 material, in combination. As illustrated in FIG. 8, for example, optimal removal efficiency for three electrode materials used in conjunction with one material-type for workpiece 22 are given by curves A, B and C for negative-type graphite (i.e., a graphite electrode impressed with a negative potential), positive-type graphite and copper, respectively. It should be noted that the units for $J_0$ are in grams/(min × A). The data represented by the family of curves shown in FIG. 8 advantageously can be stored in memory 130 in the form of a look-up table so that optimal removal efficiency for each electrode/workpiece combination can be retrieved when peak current $I_p$, which is readily available from the accumulated current data stored in memory 128, is known.

Next, step S8 is performed, wherein current removal efficiency J is compared with optimal removal efficiency $J_0$ to determine whether or not adjustments to the operating parameters of EDM apparatus 1' are required to more closely match the optimal removal efficiency $J_0$. During step S8, the current removal efficiency J advantageously is compared with a predetermined percentage of optimal removal efficiency $J_0$. Preferably, the predetermined percentage is in a range of about 70 to 100 percent, although this range advantageously can be either wider or narrower depending on the operating characteristics of EDM apparatus 1'. It will be appreciated that the current efficiency control technique according to the present invention does not attempt to exactly match the current removal efficiency J to the optimal removal efficiency $J_0$ since exceeding the optimal removal efficiency $J_0$ could result in decreasing the margin between efficient material removal and undesirable machine operation effects, which are well understood by those of ordinary skill in the art, such as the production of chips in machining gap G.

When the current removal efficiency J is less than or equal to the predetermined percentage of optimal removal efficiency $J_0$, step S9 is performed whereby current removal efficiency J advantageously is adjusted. In particular, at least one of a plurality of machining parameters, which include average machining current $\bar{I}$, is adjusted to increase current removal efficiency J.

Referring back to equation (3), it will be noted that current removal efficiency J is determined by dividing current removal rate $\Delta R$ by average machining current $\bar{I}$. Thus, directly decreasing $\bar{I}$ will result in an increase in current removal efficiency J. It will be apparent that controlling the resistance value R of current limiting resistor 38 advantageously adjusts the average machining current $\bar{I}$. It will also be appreciated that oscillator 36 controls the ON and OFF time periods of switch 34, which thus controls the voltage supplied by power supply 32 and applied to electrode 10. Those of ordinary skill in the art should note that decreasing switch 34 ON time $T_{ON}$ effectively decreases the average machining current $\bar{I}$ applied to electrode 10. Thus, controlling the parameter $T_{ON}$ advantageously controls average machining current $\bar{I}$ so that decreasing $T_{ON}$ results in an increase in current removal efficiency J.

As discussed above, sludge accumulation in machining gap G can result from a low circulation rate $F_{CR}$ or flow rate $F_{CR}$ of machining solution in machining gap G which results in a decrease in the interelectrode impedance and thus causes a decrease in $V_G$. In other words, sludge accumulation and similar effects in machining gap G can result in an increase in average machining current $\bar{I}$. From FIG. 2 and the corresponding discussion above, it will be apparent that sludge accumulation and the resultant increase in average machining current $\bar{I}$ can be reduced by increasing the circulation rate $F_{CR}$ or flow rate $F_{FR}$ of machining solution 24 in machining gap G. An increased circulation rate $F_{CR}$ advantageously can be produced by increasing a jump value, i.e., adjusting the parameters controlling a jump operation to increase the circulation rate $F_{CR}$ associated with movement of electrode 10 with respect to workpiece 22. It will also be noted that a more direct method for increasing machining solution 24 flow rate $F_{FR}$ in machining gap G advantageously is available due to the presence of pump 104 in EDM apparatus 1'. In short, flow rate $F_{FR}$ of machining solution 24 in machining gap G advantageously can be increased by increasing the output of pump 104. In either case, the increased circulation rate $F_{CR}$ or flow rate $F_{FR}$ of machining solution 24 can be used to decrease sludge accumulation in machining gap G to thereby decrease the average machining current $\bar{I}$, which produces a resultant increase in current removal efficiency J.

As discussed immediately above, current removal efficiency J advantageously can be adjusted by controlling average machining current $\bar{I}$, ON time $T_{ON}$ of switch 34, a jump value corresponding to circulation rate $F_{CR}$ produced by a jump operation or flow rate $F_{FR}$ of machining solution 24 produced by pump 104. It will also be appreciated that EDM apparatus 1' advantageously can be controlled in response to control of a selected one of these four parameters. Preferably, EDM apparatus 1' is responsive to adjustment of combinations of these parameters, with the combination of parameters being selected according to the materials employed in electrode 10 and workpiece 22 as well as other considerations such as the shape of electrode 10 and the depth of the cut produced during the machining operation. It will be apparent that when the machining operation being performed is, for example, machining a deep hole with a relatively small cross-sectional area, increasing flow rate $F_{FR}$ will be more effective in decreasing sludge accumulation in machining gap G than increasing circulation rate $F_{CR}$. Different combinations of factors advantageously can be employed during different parts of the machining operation.

It will be considered by those of skill in the art that the adjustments made to obtain improved current removal efficiency can have an adverse effect upon machining, particularly as regards machining speed and the effect on electrode wear, and thus the shift in parameter values must be judiciously performed. For example, an increase in the jump value will improve circulation and sludge removal, but at the same time this will decrease overall machining speed. Further, a direct decrease in the average current will obviously result in a decrease in speed and a longer overall machining time.

An increase in the fluid flow value will result in additional cooling at the surface of the electrode, which will increase the wear ratio (a ratio of the amount of electrode wear to the amount of workpiece removal). This phenomenon occurs because a cooler electrode is unable to build up the desirable thin layer of pyrographite deposits which protects the electrode from wear. Decreasing ON time $T_{ON}$ also increases the wear ratio greatly, as is known to those of skill in the art. For example, in the case of graphite electrodes, it is known and has been shown experimentally that at lower currents the wear ratio can reach as high as 50% when the ON time is reduced to as low as 5 microseconds.

Of the above parameters, $T_{ON}$ has by far the greatest effect upon machining and upon current removal efficiency J in particular. It has not been known in the prior art to control ON time, however it has been found according to the invention that $T_{ON}$ control is highly effective in controlling machining conducted using graphite electrodes in particular.

After adjusting current removal efficiency J in stop S9, a check is made during step S10 to determine if elapsed machining time $T_M$ is greater than or equal to a predetermined time period $T_0$. Preferably, time period $T_0$ is equal to about 10 minutes. When $T_M$ is greater than or equal to $T_0$, step S11 is performed, whereby the machining operation is stopped and the program returns to the beginning of step S2. Thus, steps S2 through S10 are repeated.

During this repetitive sequence, when the value of J is corrected to the extent that the comparison of step S8 yields a negative result, step S9' is performed so as to "recover" from the parameter changes previously executed in step S9. The "recovery" back to the nominal parameter values may be made either all at once, or incrementally over plural passes.

When $T_M$ is less than $T_0$, step S12 is executed. During step S12, a check is made to determine whether or not the machining operation has been completed. It will be noted that this check advantageously can include, for example, a comparison of depth d, measured with respect to the z-axis, to a desired depth $d_0$. If the machining operation has not been completed, the operation of EDM apparatus 1' loops back to the beginning of step S4 and steps S4 through S10 are repeated. However, if the machining operation has been completed, the machining operation is stopped at step S13.

It will be appreciated that the current removal efficiency control technique according to the present invention advantageously can be implemented in an EDM apparatus at low cost, since the parameters used in determining and controlling current removal efficiency J are easily derived from conventional operating parameters of this type of machine.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for controlling an electric discharge machining apparatus of the type in which a workpiece is machined by generating an electric discharge across a machining gap between a confronting electrode and the workpiece through a machining solution while feeding the electrode towards the workpiece, the method comprising the steps of:

(a) determining actual current removal rate of material from the workpiece;
    (b) calculating current removal efficiency based on said actual current removal rate and average machining current applied to the electrode;
    (c) comparing said current removal efficiency with an optimal removal efficiency corresponding to peak current applied to the electrode; and
    (d) when said current removal efficiency is less than or equal to a predetermined percentage of said optimal removal efficiency, adjusting at least one of a plurality of machining parameters so as to increase said current removal efficiency.

2. The method according to claim 1, wherein said at least one of a plurality of parameters is ON time of a voltage applied across said machining gap between the electrode and the workpiece, and wherein said adjusting step (d) comprises the step of decreasing said ON time of said voltage.

3. The method according to claim 1, wherein said at least one of a plurality of parameters is a jump value corresponding to circulation rate and wherein said adjusting step (d) comprises the step of increasing said jump value.

4. The method according to claim 1, wherein said at least one of a plurality of parameters is flow rate of the machining solution in the machining gap between the electrode and the workpiece, and wherein said adjusting step (d) comprises the step of increasing said flow rate.

5. The method according to claim 1, wherein said adjusting step (d) comprises the step of decreasing said average machining current.

6. A method for controlling an electric discharge machining apparatus of the type in which a workpiece is machined by generating an electric discharge across a machining gap between a confronting electrode and the workpiece through a machining solution while feeding the electrode towards the workpiece, said method comprising the steps of:

(a) determining a first value corresponding to surface area of the electrode opposing the workpiece;
    (b) starting a machining operation;
    (c) measuring average machining current applied to the electrode;
    (d) calculating current removal rate based on said first value, change in depth of the electrode and elapsed time;

(e) computing current removal efficiency based on said current removal rate and said average machining current;

(f) determining optimal removal efficiency based on peak current applied to the electrode;

(g) comparing said current removal efficiency with said optimal removal efficiency;

(h) when said current removal efficiency is less than or equal to a predetermined percentage of said optimal removal efficiency, adjusting at least one of a plurality of machining parameters including average machining current so as to increase said current removal efficiency;

(i) when machining time is greater than or equal to a predetermined time, stopping said machining operation and repeating said steps (a) through (h); and (j) when said machining time is less than said predetermined time, repeating said steps (c) through (h) until said machining operation is complete.

7. The method according to claim 6, wherein said step (e) comprises the step of calculating said current removal rate by multiplying said first value by said change in depth of the electrode and dividing the result by said elapsed time.

8. The method according to claim 6, wherein said step (e) comprises the step of computing said current removal efficiency by dividing said current removal rate by said average machining current applied to the electrode.

9. The method according to claim 6, wherein said step (a) comprises the steps of:

(k) determining gap distance between the electrode and the workpiece;

(l) measuring capacitance between the electrode and the workpiece;

(m) retrieving said first value from stored data relating said capacitance and said gap distance to said surface area of the electrode.

10. The method according to claim 6, wherein said step (f) comprises the step of determining optimal removal efficiency from data relating said peak current applied to the electrode and material comprising the electrode.

11. The method according to claim 6, wherein said predetermined percentage is within a range of about 70% to 100%.

12. The method according to claim 6, wherein said at least one of a plurality of parameters is ON time of a voltage applied across the machining gap between the electrode and the workpiece, and wherein said step (h) comprises the step of decreasing said ON time of said voltage.

13. The method according to claim 6, wherein said at least one of a plurality of parameters is a jump value corresponding to circulation rate and wherein said step (h) comprises the step of increasing said jump value.

14. The method according to claim 6, wherein said at least one of a plurality of parameters is flow rate of the machining solution in the machining gap between the electrode and the workpiece, and wherein said step (h) comprises the step of increasing said flow rate.

15. The method according to claim 6, wherein said step (h) comprises the step of decreasing said average machining current.

16. A method for controlling an electric discharge machining apparatus of the type in which a workpiece is machined by generating an electric discharge across a machining gap between a confronting electrode and the workpiece through a machining solution while feeding the electrode towards the workpiece, the method comprising the steps of:

(a) determining actual current removal rate of material from the workpiece;

(b) calculating current removal efficiency based on said actual current removal rate and average machining current applied to the electrode;

(c) comparing said current removal efficiency with an optimal removal efficiency corresponding to peak current applied to the electrode; and (d) when said current removal efficiency is less than or equal to a predetermined percentage of said optimal removal efficiency, adjusting the ON time of a voltage applied across said machining gap between the electrode and the workpiece so as to increase said current removal efficiency.

17. A method for controlling an electric discharge machining apparatus of the type in which a workpiece is machined by generating an electric discharge across a machining gap between a confronting electrode and the workpiece through a machining solution while feeding the electrode towards the workpiece, said method comprising the steps of:

(a) determining actual current removal rate of material from the workpiece;

(b) calculating current removal efficiency;

(c) comparing said current removal efficiency with an optimal removal efficiency; and (d) when said current removal efficiency is less than or equal to a predetermined percentage of said optimal removal efficiency, adjusting at least one of a plurality of machining parameters so as to increase said current removal efficiency.

18. A method according to claim 17, further comprising the step of:

determining a surface area of the electrode opposing the workpiece, prior to step (a).

19. A method according to claim 18, wherein said step of determining actual current removal rate of material from the workpiece is based on said surface area of said electrode, change in movement of said electrode and an elapsed time.

20. A method according to claim 17, wherein said at least one of a plurality of machining parameters includes average machining current.

21. A method according to claim 17, wherein said optimal removal efficiency is that corresponding to peak current applied to the electrode.

22. A method according to claim 17, wherein said step of calculating current removal efficiency is based on said actual current removal rate and average machining current applied to the electrode.

* * * * *